(12) United States Patent
Laufer et al.

(10) Patent No.: US 9,709,199 B2
(45) Date of Patent: Jul. 18, 2017

(54) COUPLING PART FOR A COUPLING FOR PRESSURE MEDIUM LINES

(71) Applicant: U.M. Gewerbeimmobilien GmbH & Co. KG, Werdohl (DE)

(72) Inventors: Klaus Laufer, Meinerzhagen (DE); Sabine Meissner-Lebershausen, Herscheid (DE); Artur Firus, Iserlohn (DE); Christoph Ginczek, Marienheide (DE)

(73) Assignee: U.M. Gewerbeimmobilien GmbH & Co. KG, Werdohl (DE)

( * ) Notice: Subject to any disclaimer, the term of this patent is extended or adjusted under 35 U.S.C. 154(b) by 0 days.

(21) Appl. No.: 14/794,964

(22) Filed: Jul. 9, 2015

(65) Prior Publication Data

US 2016/0018036 A1    Jan. 21, 2016

(30) Foreign Application Priority Data

Jul. 16, 2014   (DE) .......................... 10 2014 010 570

(51) Int. Cl.
*F16L 29/04* (2006.01)
*F16L 37/34* (2006.01)

(52) U.S. Cl.
CPC .............. *F16L 29/04* (2013.01); *F16L 37/34* (2013.01); *Y10T 137/87949* (2015.04)

(58) Field of Classification Search
CPC . F16L 29/02; F16L 29/04; F16L 37/34; F16L 37/413
USPC ........................................ 137/614.03–614.05
See application file for complete search history.

(56) References Cited

U.S. PATENT DOCUMENTS

| 4,577,833 | A | | 3/1986 | Bormioli | |
|---|---|---|---|---|---|
| 6,026,857 | A | * | 2/2000 | Stucchi | F16L 37/23 137/614 |
| 6,382,251 | B1 | * | 5/2002 | Hopson | F16L 37/23 137/614 |
| 8,960,726 | B2 | * | 2/2015 | Nick | F16L 19/005 285/84 |

FOREIGN PATENT DOCUMENTS

| EP | 0 123 328 A1 | 10/1984 |
|---|---|---|
| EP | 1 707 863 B1 | 7/2008 |

* cited by examiner

*Primary Examiner* — Kevin Lee
(74) *Attorney, Agent, or Firm* — Collard & Roe, P.C.

(57) ABSTRACT

A coupling part coupling with a corresponding coupling part of a coupling for pressure medium lines has a housing having a flow channel and a coupling axis, and a sleeve-like closing valve displaceable back and forth axially within the flow channel, for closing off the flow channel in the uncoupled state of the coupling part. The closing valve has a closed valve position and an open valve position, closing off and not closing the flow channel, respectively. A plunger within the flow channel displaceable back and forth axially drives the closing valve in a valve opening direction during coupling. A plunger pin between the plunger and the closing valve within the flow channel, displaceable back and forth axially, transfers the movement of the plunger in the valve opening direction to the closing valve. The plunger pin is connected with the closing valve so as to be non-displaceable axially.

14 Claims, 10 Drawing Sheets

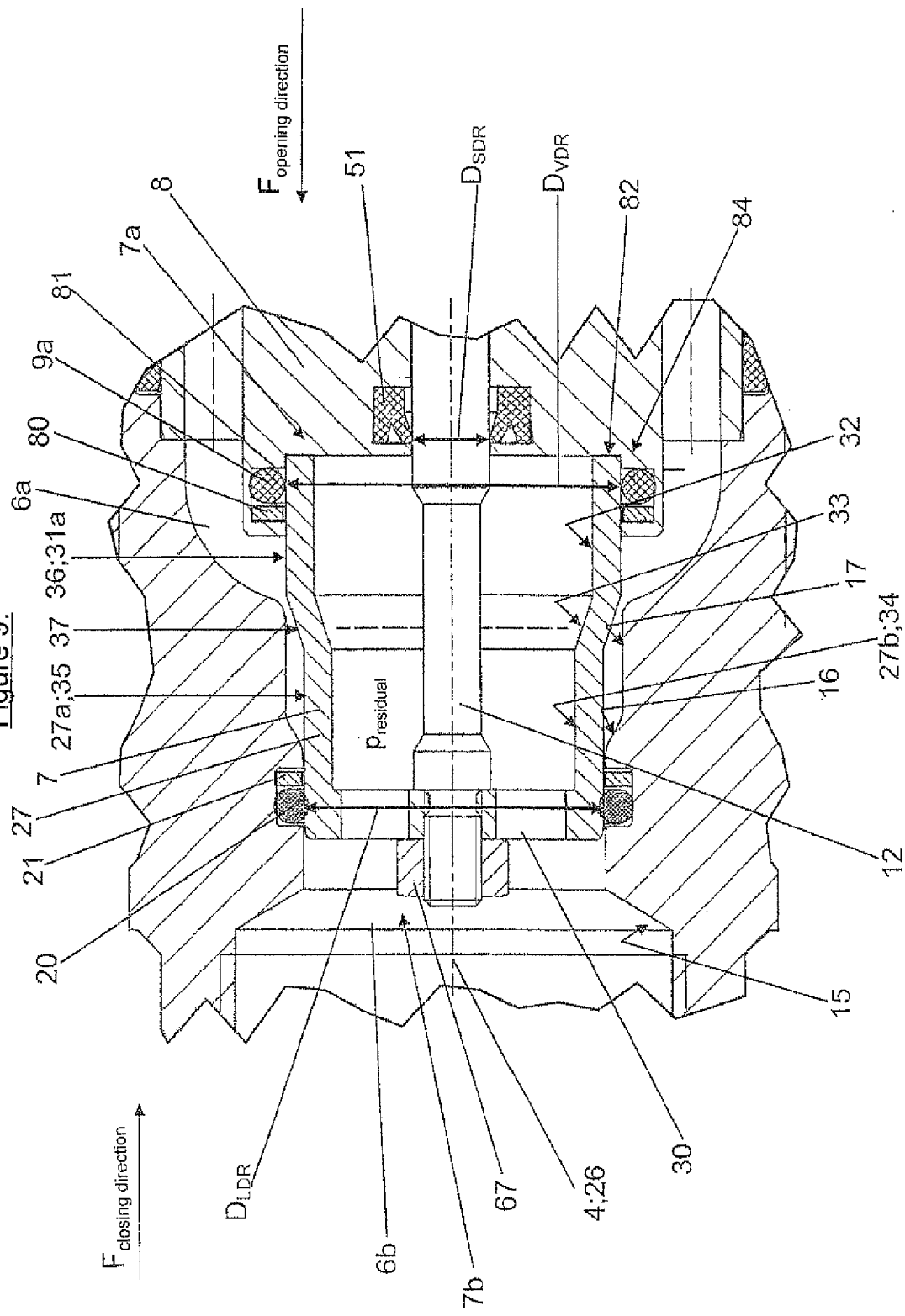

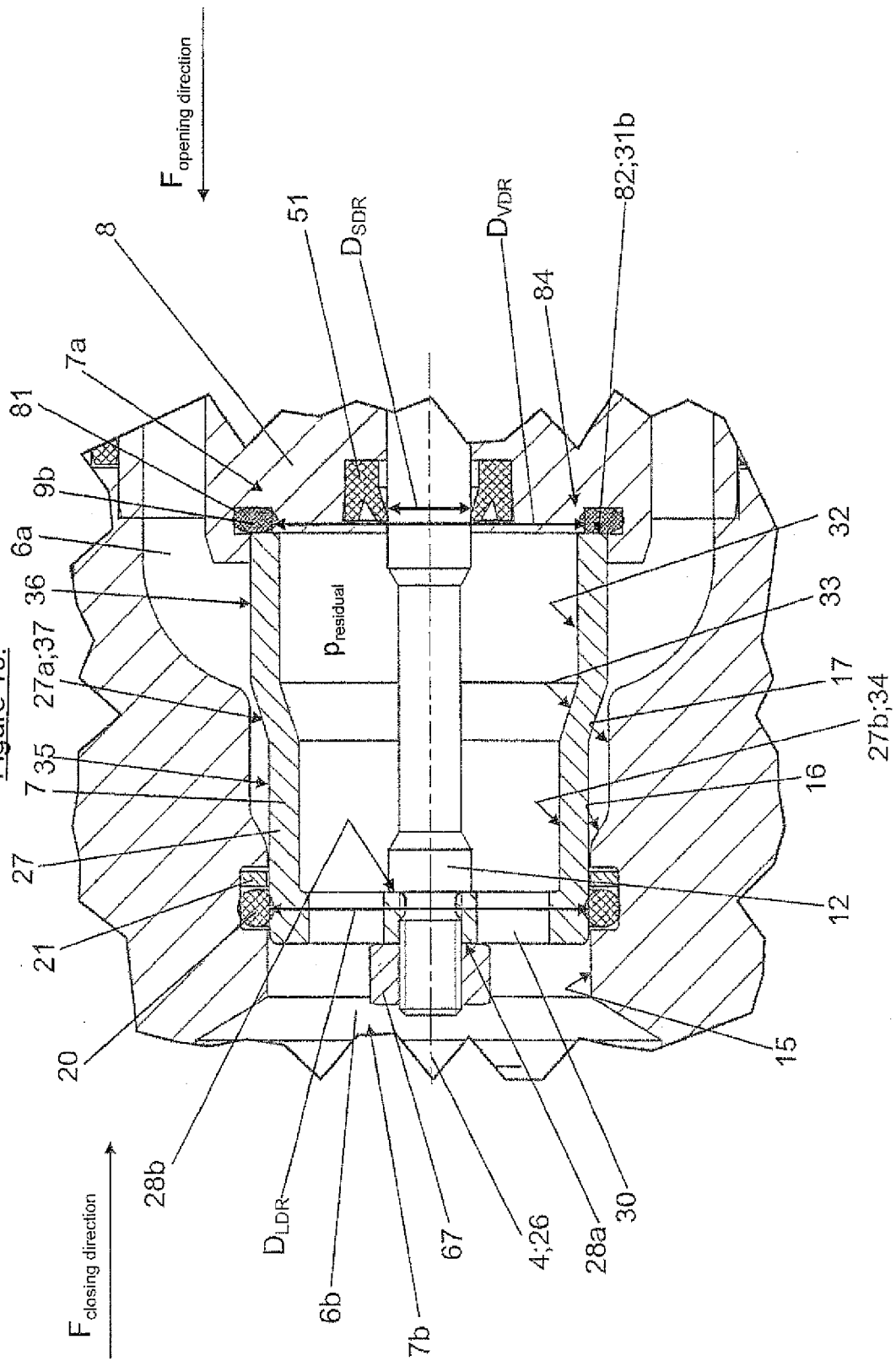

COUPLING PART FOR A COUPLING FOR PRESSURE MEDIUM LINES

CROSS REFERENCE TO RELATED APPLICATIONS

Applicant claims priority under 35 U.S.C. §119 of German Application No. 10 2014 010 570.9 filed Jul. 16, 2014, the disclosure of which is incorporated by reference.

BACKGROUND OF THE INVENTION

1. Field of the Invention

The present invention relates to a coupling part, particularly a coupling plug, for a coupling for pressure medium lines, particularly hydraulic lines, as well as to a coupling having such a coupling part.

2. Description of the Related Art

Such couplings are configured, for example, as plug-in couplings or screw couplings, and guarantee rapid connection and disconnection of two pressure medium lines, particularly hydraulic lines. They have two coupling parts that can be plugged into one another, namely a coupling plug and a coupling cuff. The coupling plug can be inserted into an accommodation opening of the coupling cuff and can be locked into it in releasable manner. If locking takes place by means of a screw connection, for example by means of a locking sleeve, the coupling is referred to as a screw coupling. A plug-in coupling has a retaining ball locking mechanism as the locking means. Each coupling part furthermore has a coupling housing, within which a spring-loaded valve is disposed. In the uncoupled state, the valves are disposed in such a manner that they close off the respective coupling part. When the two coupling parts are plugged into one another, the valves reciprocally open automatically, and when the parts are uncoupled, the valves close automatically, by means of spring force.

Such a plug-in coupling, configured as a quick-release coupling, is known, for example, from EP 1 707 863 B1. The known plug-in coupling has a coupling cuff and a coupling plug having a sleeve-like closing valve, a plunger and a plunger pin. When the two coupling parts are plugged into one another, the plunger, together with the plunger pin, is moved in the opening direction, until the plunger pin makes contact with the closing valve. Then the closing valve is entrained by the plunger pin and the flow channel is opened. In this connection, a spring is disposed around the plunger pin and drives the plunger into its starting position. A further spring directly drives the closing valve into its closed position. This spring is disposed either around the closing valve or behind it.

SUMMARY OF THE INVENTION

It is the task of the present invention to make available a coupling part, particularly a coupling plug, that can be produced in cost-advantageous manner, for a coupling for pressure medium lines, particularly hydraulic lines, which part can be plugged together with a corresponding complementary coupling part with little expenditure of force, even when pressure from the pressure medium is applied to the coupling part.

It is a further task to make available a coupling having such a coupling part.

These and other tasks are accomplished in one aspect according to the invention by means of a coupling part, particularly a coupling plug, for coupling with a corresponding coupling part, particularly a coupling cuff, of a coupling for pressure medium lines, particularly hydraulic lines, having a housing having a flow channel and a coupling axis, as well as a) a sleeve-like closing valve disposed to be displaceable back and forth in the axial direction within the flow channel, for closing off the flow channel in the uncoupled state of the coupling part, wherein the closing valve has a closed valve position, closing off the flow channel, and an open valve position, not closing off the flow channel, b) a plunger disposed within the flow channel so as to be displaceable back and forth in the axial direction, to drive the closing valve in a valve opening direction during the coupling process, c) a plunger pin disposed within the flow channel so as to be displaceable back and forth in the axial direction, which pin is disposed between the plunger and the closing valve and by means of which the movement of the plunger in the valve opening direction can be transferred to the closing valve, wherein the plunger pin is connected with the closing valve so as to be non-displaceable in the axial direction.

In another aspect according to the invention, these tasks are accomplished by a coupling part, particularly a coupling plug, of a coupling for pressure medium lines, particularly hydraulic lines, for being coupled together with a corresponding coupling part, particularly a coupling cuff, in the direction of a coupling axis, preferably a coupling part according to the first aspect of the invention, having a) a housing having a flow channel, wherein the housing has a coupling end and a line end in the axial direction, b) a valve seal having a closing valve disposed within the flow channel so as to be displaceable back and forth in the axial direction, to close off the flow channel in the uncoupled state of the coupling part, wherein the closing valve has a closed valve position, closing off the flow channel, and an open valve position, not closing off the flow channel, and separates the flow channel, in the closed valve position, into a coupling-side flow space and a line-side flow space), in terms of flow technology, wherein in the closed valve position, it holds true for the sum $A_{closing\ direction,\ closed}$ of all the attack surfaces to which a residual pressure $p_{residual}$ that can occur in the line-side flow space is applied, in such a manner that a closing force $F_{closing\ direction}$ that is directed in the valve closing direction acts on the closing valve, and for the sum $A_{opening\ direction,\ closed}$ of all the attack surfaces to which a residual pressure $p_{residual}$ that can occur in the line-side flow space is applied, in such a manner that a force $F_{opening\ direction}$ that is directed in the valve opening direction acts on the closing valve, that:

$$A_{pressure,\ res,\ closed} = A_{closing\ direction,\ closed} - A_{opening\ direction,\ closed},$$

wherein $A_{pressure,\ res,\ closed}$ amounts to 0 to 300 mm$^2$, preferably 0 to 240 mm$^2$, preferentially 0 to 12 mm$^2$, particularly preferentially 0 to 8 mm$^2$.

In an additional aspect according to the invention, these tasks are accomplished by a coupling for pressure medium lines, particularly hydraulic lines, having two coupling parts that can be releasably locked into one another, particularly a coupling cuff and a coupling plug, wherein the coupling parts each have a coupling housing having a flow channel and a closing valve disposed within the flow channel, to close off the flow channel in the uncoupled state of the coupling, wherein the two closing valves are automatically opened when the two coupling parts are coupled, wherein one of the two coupling parts is configured according to one of the first or second aspects of the invention.

Advantageous further developments of the invention are discussed below.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 9 shows a magnified representation of the region of a pressure-equalized closing valve according to a further embodiment with a plunger pin; and FIG. 10 shows a magnified representation of the region of a pressure-equalized closing valve according to a further embodiment with a plunger pin.

DETAILED DESCRIPTION OF PREFERRED EMBODIMENTS

Figure 1:
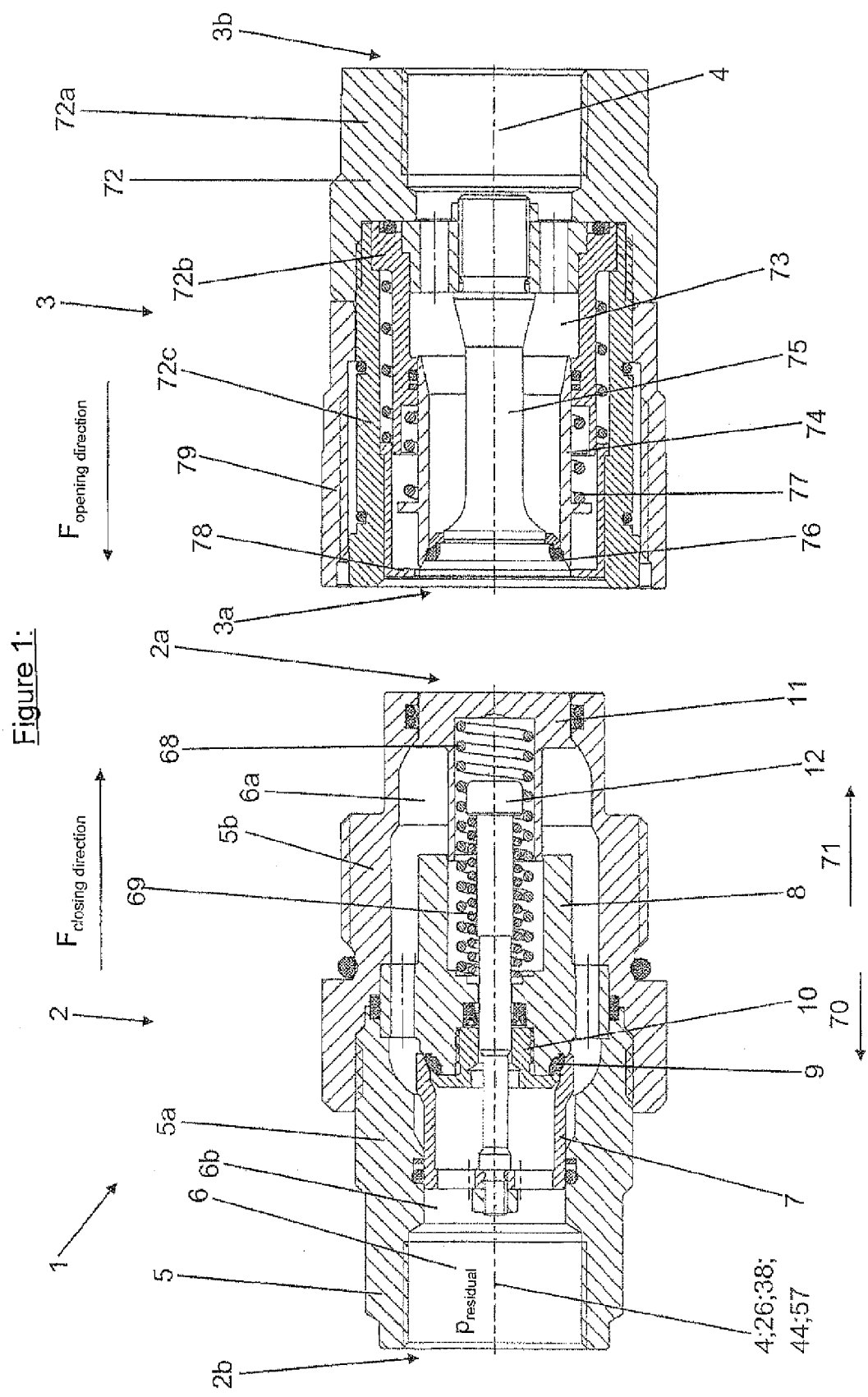
FIG. 1 shows a longitudinal section through the coupling according to the invention, having a coupling cuff and a coupling plug in the non-plugged or uncoupled state.
Figure 2:
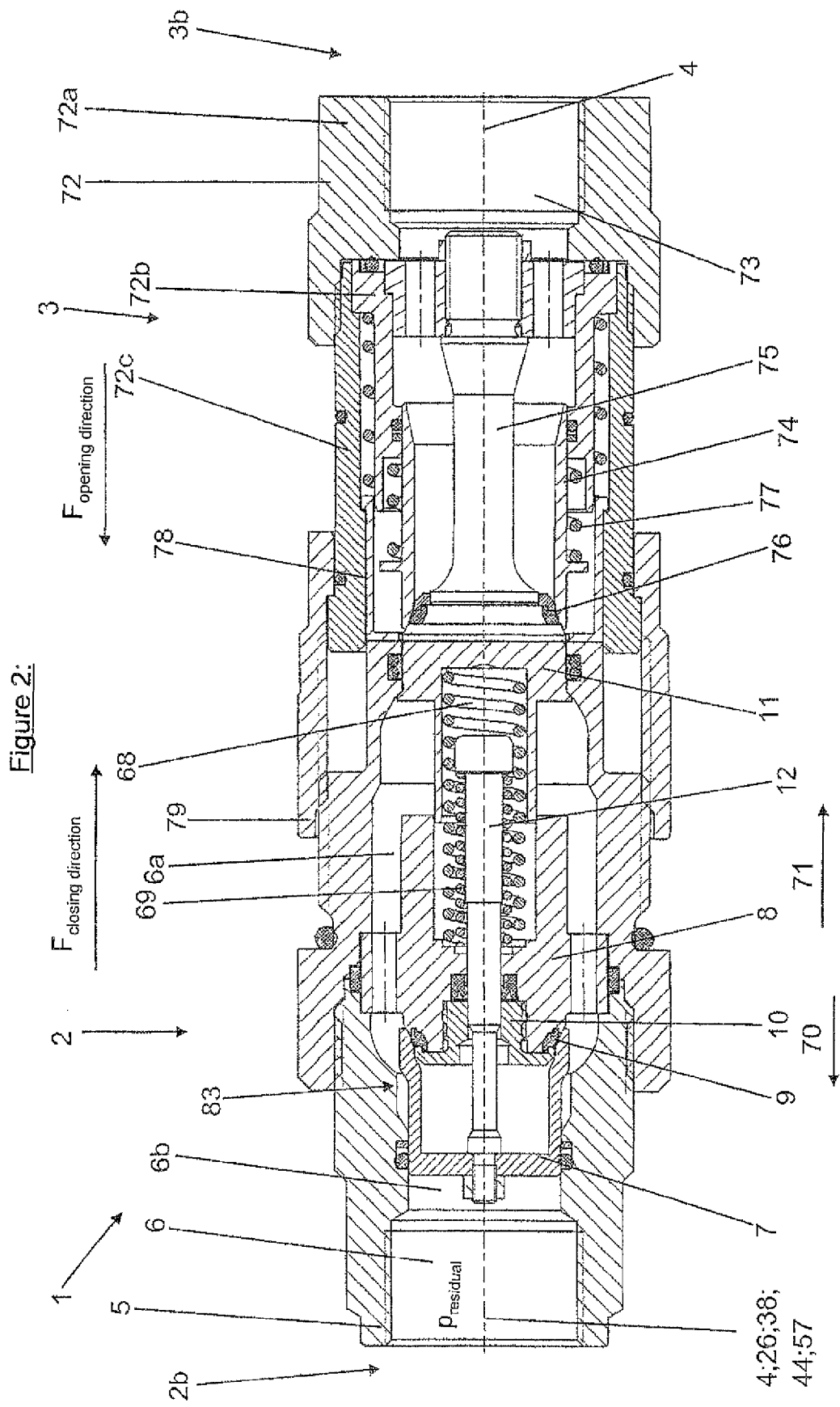
FIG. 2 shows a longitudinal section of the coupling according to the invention, at the beginning of the plug-in process.

The screw coupling 1 according to the invention (FIGS. 1-4) has two coupling parts 2; 3 that can be plugged into one another in the direction of a coupling axis or plug-in axis 4, namely a coupling plug 2 according to the invention and a coupling cuff 3. Usually, the coupling plug 2 is disposed on the side of a consumer or power unit (receiving side), and the coupling cuff 3 is disposed on the side of a pressure medium pump, particularly a hydraulic pump (supply side). In certain applications, in which a residual pressure $p_{residual}$ (also) remains on the supply side, the coupling plug 2 can also be disposed on the supply side.

The coupling plug 2 according to the invention and the coupling cuff 3 each have a coupling end 2a; 3a and a connection or line end 2b; 3b, wherein the two ends 2a; 2b and 3a; 3b lie opposite one another in the direction of the coupling axis 4. At the coupling end 2a; 3a, coupling plug 2 and coupling cuff 3 are plugged into one another. At the connection end 2b; 3b, the coupling plug 2 and the coupling cuff 3 are connected with the respective pressure medium line (not shown), particularly a hydraulic line.

The terms used hereinafter, "axially," "radially," and "in the circumference direction" always relate, unless specified otherwise, to the coupling axis 4 or to a longitudinal valve axis 26 or to a longitudinal pin axis 38 or to a bushing axis 44 or to a plunger axis 57. The term "circular-cylindrical" also relates to the coupling axis 4 or to the longitudinal valve axis 26 or longitudinal pin axis 38 or bushing axis 44 or plunger axis 57 as the center axis or axis of rotation.

The present invention especially relates to the coupling plug 2, and for this reason, the latter will first be described in greater detail below:

The coupling plug 2 according to the invention has a plug housing 5 having a through-flow channel or flow channel 6 for the pressure medium, particularly the hydraulic medium, a valve seat 83 having a sleeve-like closing valve 7 and a valve sealing ring 9, a bearing bushing 8, preferably a chambering sleeve 10, an outer plunger 11, as well as an inner plunger pin 12.

The plug housing 5 has a first, line-side, sleeve-like plug housing part 5a and a second, coupling-side, sleeve-like plug housing part 5b. The first and the second housing part 5a; 5b are firmly connected with one another, but preferably in releasable manner, particularly screwed together. The flow channel 6 passes through the coupling plug 2, particularly through the plug housing 5, from the coupling end 2a all the way to the connection end 2b. The flow channel 6 therefore extends through the plug housing 5 in the direction of the coupling axis 4.

Figure 5:
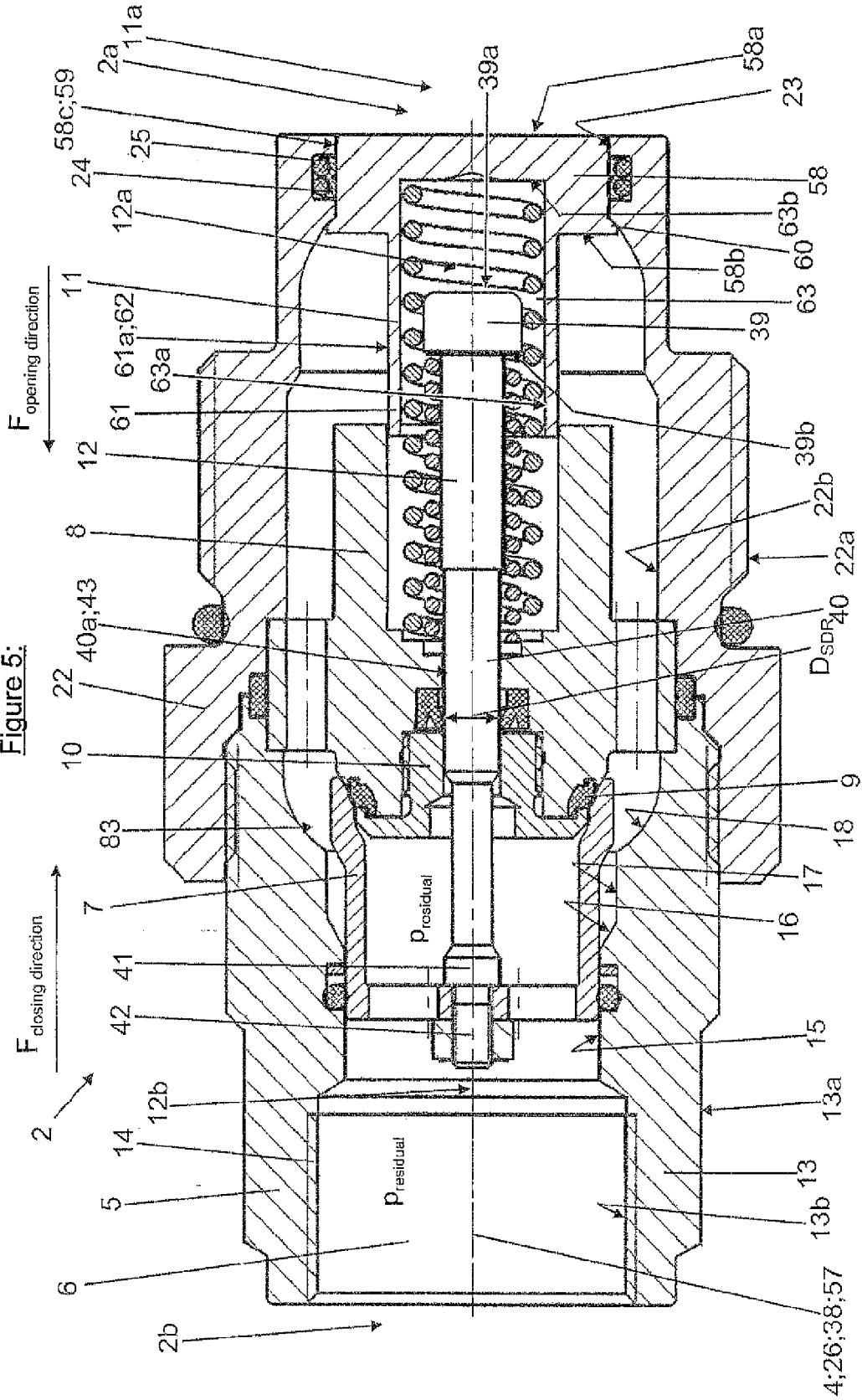
FIG. 5 shows a longitudinal section of the coupling plug according to the invention, in the uncoupled starting position, with a closing valve in the closed position.
Figure 6:
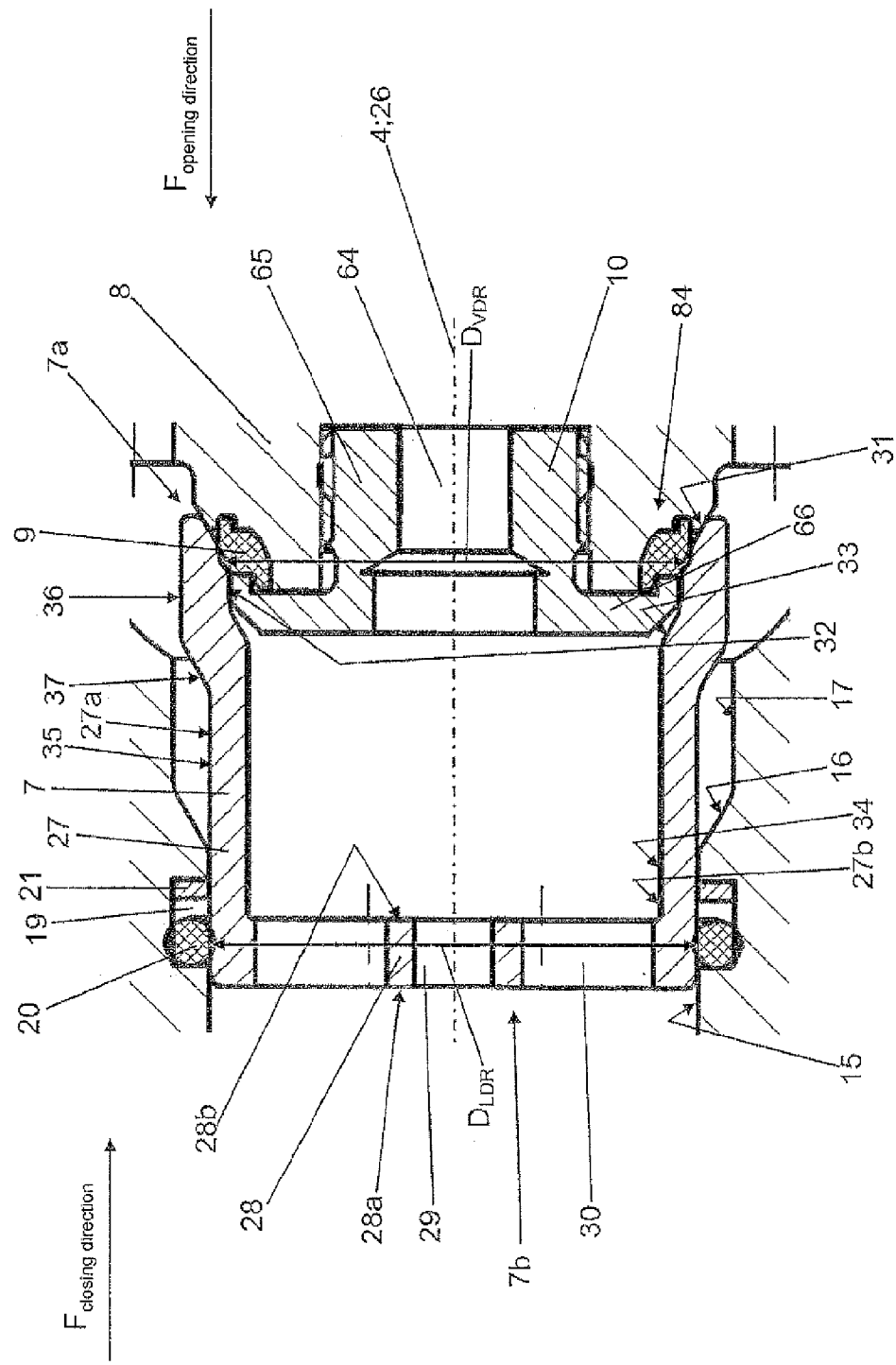
FIG. 6 shows a magnified representation of the region of the closing valve according to FIG. 5, without a plunger pin.
Figure 7:
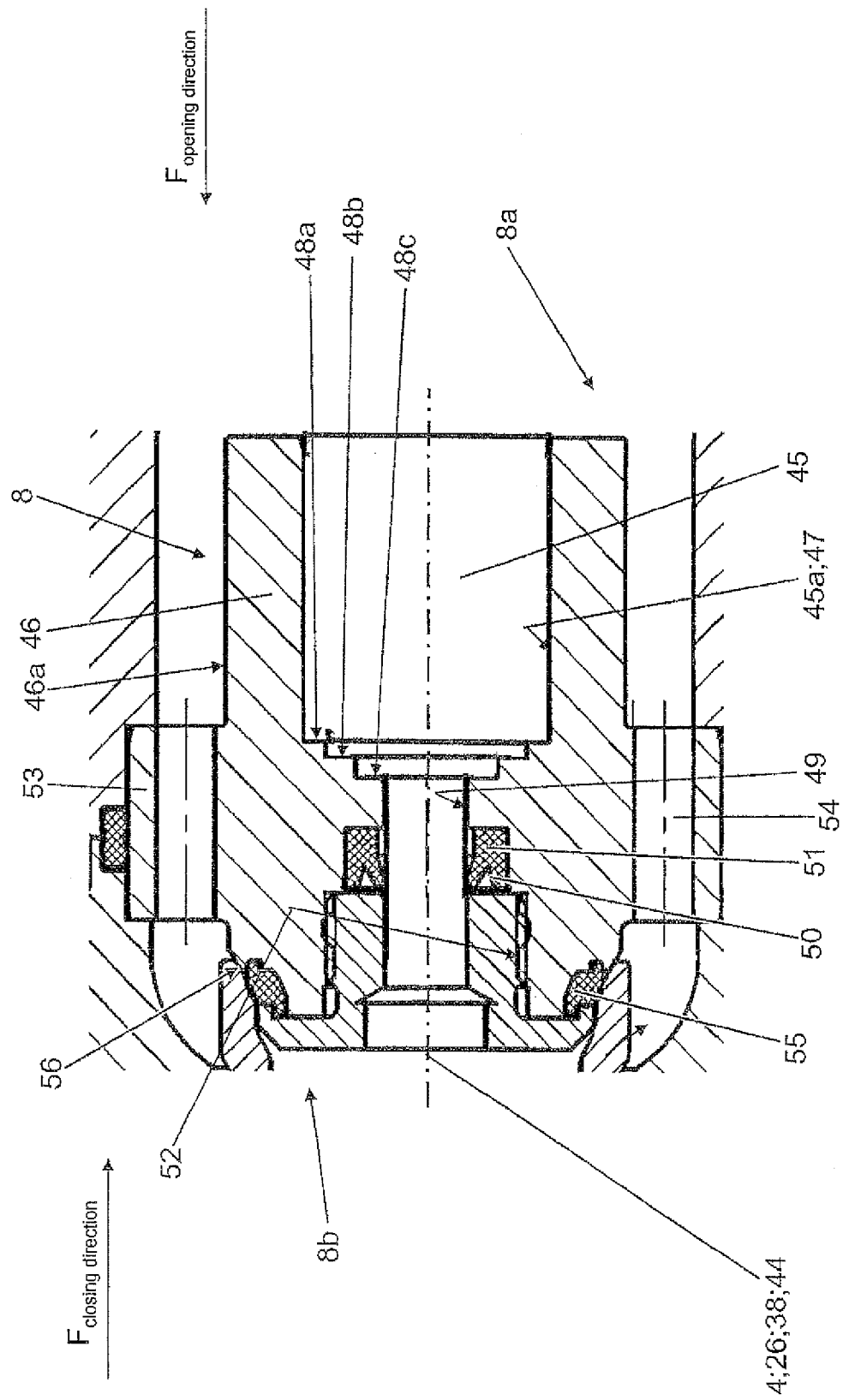
FIG. 7 shows a magnified representation of the region of a bearing sleeve according to FIG. 5.

The first plug housing part 5a preferably consists of metal, particularly of machining steel, quenched and tempered steel or nitrided steel. Furthermore, the first plug housing part 5a has a housing wall 13 having an outer wall surface 13a and an inner wall surface 13b. See FIG. 5. The inner contour of the housing wall 13, viewed in the direction of the coupling axis 4 from the connection end 2b to the coupling end 2a, at first has an inner thread 14, a circular-cylindrical valve guide section 15 having a lesser diameter, a widening, conical valve contact surface 16, a circular-cylindrical surface 17, as well as an arc-shaped widening surface 18. In the region of the valve guide section 15, the plug housing part 5a furthermore has a ring groove 19 for accommodating a valve bearing sealing ring 20 and a support ring 21. See FIG. 6.

The second plug housing part 5b also preferably consists of metal, particularly of machining steel or nitrided steel. Furthermore, the second plug housing part 5b has a housing wall 22 having an outer wall surface 22a and an inner wall surface 22b. See FIG. 5. The inner contour of the housing wall 22 has a circular-cylindrical plunger guide surface 23 for guiding the outer plunger 11, at the coupling end 2a. In the region of the plunger guide surface 23, a ring groove 24 for accommodating two sealing rings 25 is provided.

The sleeve-like or beaker-like closing valve 7 (FIGS. 1-6) preferably consists of metal, particularly of machining steel or quenched and tempered steel. It is disposed within the plug housing 5 and serves for closing off the flow channel 6 in the uncoupled state of the coupling plug 2. It thereby divides the flow channel 6, viewed in the direction of the coupling axis 4, viewed in the closed position, into a coupling-side flow space and a line-side flow space 6a; 6b. The closing valve 7 has the longitudinal valve axis 26, which is coaxial with the coupling axis 4. Viewed in the direction of the longitudinal valve axis 26, the closing valve 7 has a first, coupling-side valve end 7a and a second, connection-side valve end 7b. Furthermore, the closing valve 7 has a tubular sleeve wall 27 and a sleeve bottom 28.

The sleeve bottom 28 is disposed at the second valve end 7b and has an outer bottom surface 28a, particularly a planar surface, and an inner bottom surface 28b that lies opposite to it and faces the first valve end 7a, particularly a planar surface. Furthermore, the sleeve bottom 28 has a central plunger accommodation recess 29 that passes through from the outer bottom surface 28a to the inner bottom surface 28b. Furthermore, the sleeve bottom 28 has multiple flow passages 30 disposed so as to be distributed in the circumference direction. The flow passages 30 extend through the sleeve bottom 28 from the outer bottom surface 28a to the inner bottom surface 28b.

The sleeve circumference wall 27 extends in the axial direction away from the sleeve bottom 28 and has an outer wall surface 27a and an inner wall surface 27b. At the first valve end 7a, the inner wall surface 27b has a conical or cone-shaped valve sealing surface 31, which serves for sealing contact with the valve sealing ring 9. The valve sealing surface 31 narrows, viewed toward the second valve end 7b. A first circular-cylindrical surface 32 follows the valve sealing surface 31, viewed in the direction from the first valve end 7a to the second valve end 7b. The first circular-cylindrical surface 32 makes a transition into a second circular-cylindrical surface 34 by way of a transition surface 33. The second circular-cylindrical surface 34 has a lesser diameter than the first circular-cylindrical surface 32. The inner cross-section of the closing valve 7 therefore narrows toward the second valve end 7b and widens toward the first valve end 7a. The second circular-cylindrical surface 34 follows the sleeve bottom 28.

The outer wall surface 27a of the sleeve wall 27 has a circular-cylindrical valve sliding and sealing surface 35, the diameter of which is slightly less than the diameter of the valve guide surface 15. The valve sliding and sealing surface 35 follows the sleeve bottom 28. At the first valve end 7a, the outer wall surface 27a has a cylindrical surface 36, the diameter of which is greater than the diameter of the valve sliding and sealing surface 35. The valve sliding and sealing surface 35 and the cylindrical surface 36 make a transition into one another by way of a conical valve contact surface 37. The outer cross-section of the closing valve 7, analogous to the inner cross-section, therefore narrows toward the second valve end 7b and widens toward the first valve end 7a.

The plunger pin 12 (FIGS. 1-5) has a first, coupling-side pin end 12a and a second, connection-side pin end 12b. Furthermore, the plunger pin 12 has a longitudinal pin axis 38, which is coaxial to the longitudinal valve axis 26 and to the coupling axis 4. At the coupling-side pin end 12a, the plunger pin 12 has a pin head 39 having an upper head side 39a and a lower head side 39b that lies opposite to the upper head side 39a. Furthermore, the plunger pin 12 has a pin shaft 40 that follows the lower head side 39b and projects away from the lower head side 39b in the axial direction. At the connection-side pin end 12b, the pin shaft 40 has a ring-shaped installation collar 41 and a threaded stud 42 having an outside thread that projects away from the installation collar 41. The pin shaft 40 has an outer shaft surface 40a, which preferably narrows twice from the pin head 39 to the installation collar 41. In the center, the outer shaft surface 40a forms a pin sliding and sealing surface 43, which serves for sliding mounting of the plunger pin 12 in the bearing bushing 8 and for sealing between the two flow spaces 6a and 6b or for separation of the two flow spaces 6a and 6b, in terms of flow technology.

The bearing bushing 8 also has a first, coupling-side bushing end 8a and a second, connection-side bushing end 8b. The bushing axis 44 is furthermore also coaxial with the coupling axis 4. The bearing bushing 8 furthermore has a bushing recess 45 that is continuous through the bearing bushing 8 in the axial direction, having a recess surface 45a, and a bushing wall 46 that surrounds or delimits the bushing recess 45, having an outer wall surface 46a.

The recess surface 45a at first has a circular-cylindrical plunger guide surface 47 for guiding and mounting the outer plunger 11, at the coupling-side bushing end 8a. Subsequent to this surface, the bushing recess 45 narrows three times, in steps, viewed in the direction toward the connection-side bushing end 8b, wherein ring disk surfaces 48a; 48b; 48c are formed, in each instance, which are perpendicular to the bushing axis 44.

A circular-cylindrical pin guide or mounting surface 49 follows the third ring disk surface 48c, viewed toward the connection-side bushing end 8b, which surface serves for sliding mounting of the plunger pin 12. Subsequent to the pin mounting surface 49, the bushing recess 45 widens twice, in steps, viewed toward the connection-side bushing end 8b, wherein at first, a ring-shaped accommodation groove 50 for accommodating a plunger sealing ring 51, for example a groove ring, is formed.

Figure 8:
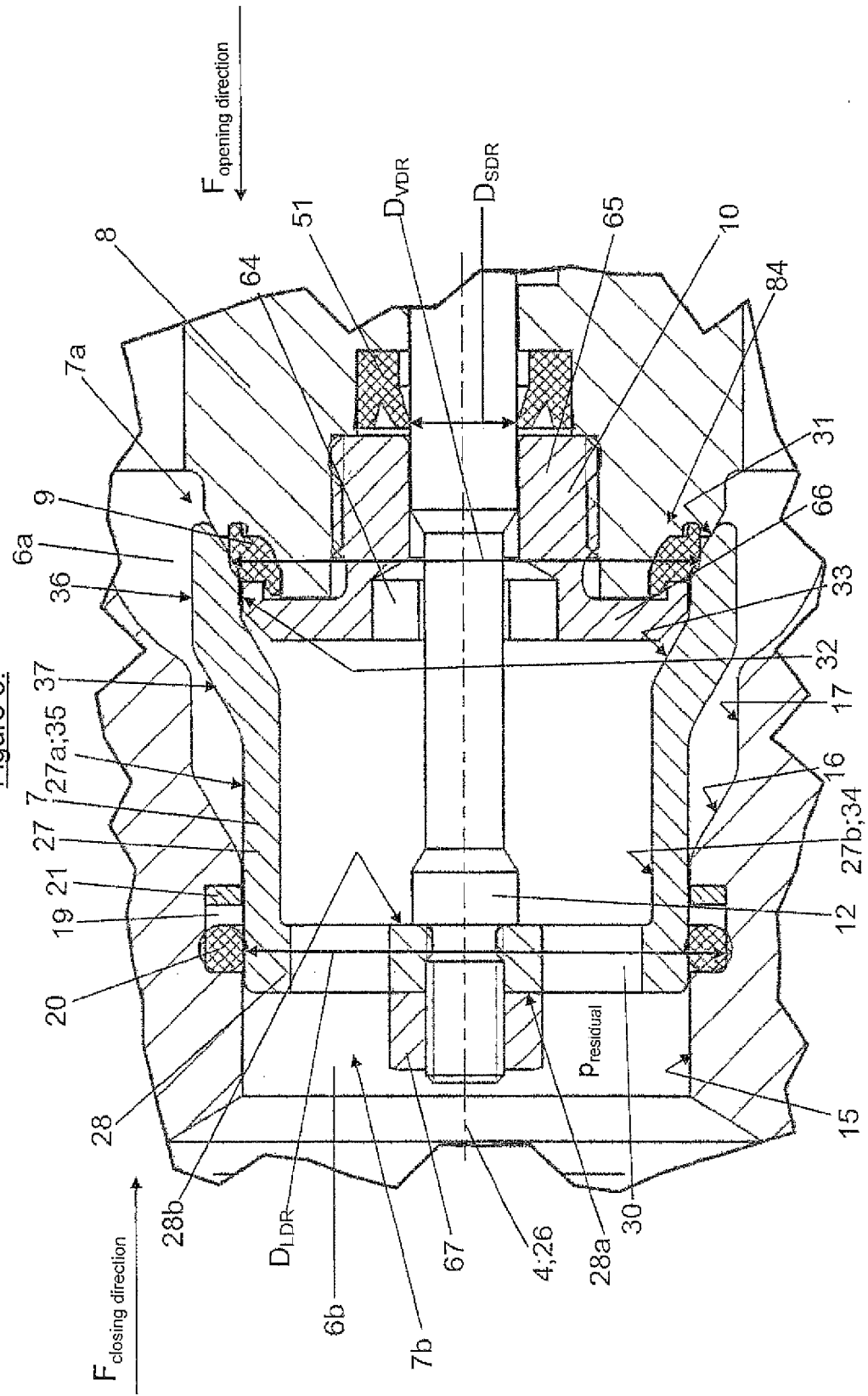
FIG. 8 shows a magnified representation of the region of a pressure-equalized closing valve with a plunger pin.

The plunger sealing ring 51 has a sealing diameter $D_{SDR}$ (FIG. 8). A region 52 having an inside thread, which region serves to accommodate the chambering sleeve 10, follows the accommodation groove 50.

The outer wall surface 46a of the bushing wall 46 is configured to be circular-cylindrical. The bearing bushing 8 furthermore has a ring-shaped bearing collar 53 that projects radially away from the outer wall surface 46a. The bearing collar 53 serves for non-displaceable or locally fixed mounting of the bearing bushing 8 in the plug housing 5, which will be discussed in greater detail below. To allow the respective pressure medium to pass through, the bearing collar 53 has multiple flow passages 54 disposed adjacent next to one another in the circumference direction, which pass through the bearing collar 53 in the axial direction.

At the connection-side bushing end 8b, the bearing bushing 8 furthermore has a sealing ring accommodation groove 55 for shape-fit accommodation of the valve sealing ring 9. The sealing ring accommodation groove 55 is followed, viewed in the direction toward the coupling-side bushing end 8a, by a conical or cone-shaped valve seat surface 56, which serves for contact of the valve sealing surface 31. The valve seat surface 56 widens in the radial direction from the connection-side bushing end 8b toward the coupling-side bushing end 8a. Furthermore, it has the same incline, in terms of amount, as the valve sealing surface 31. The bearing bushing 8 therefore has a valve seat 84 on its connection-side bushing end 8b, facing the closing valve 7, which seat is formed by the valve seat surface 56, the valve sealing surface 31, and the valve sealing ring 9.

The plunger, particularly beaker-shaped plunger 11, has a first, coupling-side plunger end 11a and a second, connection-side plunger end 11b. Furthermore, the plunger 11 has a plunger axis 57, which is also coaxial with the coupling axis 4. The plunger 11 furthermore has a plunger head 58, particularly in the shape of a ring disk, on the coupling-side plunger end 11a, having an upper head side 58a and a lower head side 58b, which are particularly perpendicular to the plunger axis 57. The plunger head 58 furthermore has an outer head surface 58c. The outer head surface 58c is at first configured to be circular-cylindrical on the coupling-side plunger end 11a, and forms a first plunger sliding and sealing surface 59, which serves for slide-mounting of the plunger 11 in the plug housing 5 and, in connection with the seal 20, for sealing the flow channel 6, particularly the coupling-side flow space 6a, in the uncoupled state, with regard to the surroundings or, during the coupling process, at first with regard to the coupling cuff 3. A ring stop 60 that projects radially outward with reference to the plunger sliding and sealing surface 59 follows the first plunger sliding and sealing surface 59.

The plunger 11 furthermore has a tubular plunger shaft 61, which follows the lower head side 58b and projects away from the lower head side 58b in the axial direction. The plunger shaft 61 has a circular-cylindrical outer shaft surface 61a, which forms a second plunger sliding surface 62, which serves for slide-mounting of the plunger 11 in the bearing bushing 8.

Furthermore, the plunger 11 has a plunger recess 63 in the form of a dead-end hole, which extends from the connection-side plunger end 11b into the plunger 11 in the axial direction. The plunger recess 63 is therefore open toward the closing valve 7. In this connection, the plunger recess 63 extends through the entire plunger shaft 61 all the way into the plunger head 58, and has a circular-cylindrical circumferential recess surface 63a and a bottom recess surface 63b.

The chambering sleeve 10 (FIGS. 1-6) has a chambering sleeve recess 64 that is continuous in the axial direction. Furthermore, the chambering sleeve has a tubular sleeve shaft 65 having an outside thread and a head plate 66. The sleeve shaft 65 projects away from the head plate 66 in the axial direction. The head plate 66 thereby projects beyond the sleeve shaft 65 in the radial direction, seen in an outward direction.

In the following, the assembled state of the coupling plug 2 according to the invention will now be explained in greater detail:

The two housing parts 5a and 5b are disposed adjacent to one another in the axial direction and are connected with one another firmly but preferably releasably, particularly screwed together.

As has already been explained, the bearing bushing 8 is disposed in the flow channel 6 and is mounted in the plug housing 5 in locally fixed, in other words non-displaceable manner. For this purpose, the bearing bushing 8 is clamped, for example with its bearing collar 53, between the two housing parts 5a; 5b, which are screwed to one another. In this connection, the flow passages 54 are disposed in the flow channel 6. The valve sealing ring 9 is disposed in the sealing ring accommodation groove 55 with shape fit. Furthermore, the chambering sleeve 10 is screwed into the inside thread of the region 52 of the bushing recess 45 with its chambering sleeve shaft 65. In this connection, the head plate 66 of the chambering sleeve 10 engages over the valve sealing ring 9 slightly in the radial direction, so that the valve sealing ring 9 is clamped or chambered between the bearing bushing 8 and the chambering sleeve 10, in known manner. As a result, the valve sealing ring 10 is non-displaceably mounted in the axial direction.

Furthermore, the groove or plunger sealing ring 51 is disposed on the accommodation groove 50 of the bearing bushing 8. This ring serves for a seal between the two flow spaces 6a; 6b, so that these flow spaces are not hydraulically connected with one another in the closed valve position, and the line-side residual pressure $p_{residual}$ is present only in the line-side flow space 6b and not also in the coupling-side flow space 6a.

The closing valve 7 is also disposed in the flow channel 6 and closes the latter off in a closed starting position (FIGS. 1, 5), in pressure-medium-tight or fluid-tight manner. In this connection, the closing valve 7 is mounted in the plug housing 5 so as to be displaceable back and forth, parallel to the longitudinal valve axis 26 or coupling axis 4. In particular, the valve sliding and sealing surface 35 lies against the sealing ring 20 and the support ring 21, so as to slide in the axial direction.

Furthermore, the closing valve 7 lies against the valve sealing ring 9 and the valve seat surface 56 with its valve sealing surface 31, closing off the flow channel 6. In this connection, the valve sealing ring 9 is elastically deformed. The valve sealing ring 9 is maximally deformed to such an extent that the valve sealing surface 31 also lies against the valve seat surface 56. In this position, no pressure medium, particularly no hydraulic medium, can flow through the flow channel 6. In particular, no pressure medium, particularly no hydraulic medium, can flow from the line-side flow space 6b into the coupling-side flow space 6a.

The plunger pin 12 passes through the plunger accommodation recess 29 of the sleeve bottom 28 of the closing valve 7 with its threaded stud 42. In this connection, the installation collar 41 lies against the inner bottom surface 28b. Furthermore, a nut, particularly a self-locking nut 67, is screwed onto the threaded stud 42. As a result, the plunger pin 12 is firmly, in other words non-displaceably and non-rotatably connected with the closing valve 7, particularly the sleeve bottom 28. In this connection, it is important, above all, according to the invention, that the plunger pin 12 is non-displaceably connected with the closing valve 7 in the axial direction.

The plunger pin 12 furthermore passes through the chambering sleeve recess 64 and the bushing recess 45, and engages into the plunger recess 63 of the plunger 11 with its pin head 39. In this connection, the plunger pin 12 is mounted in the bearing bushing 8 so as to be displaceable back and forth in the axial direction. For this purpose, the pin sliding and sealing surface 43 lies against the groove or plunger sealing ring 51 so as to slide in the axial direction. The groove or plunger sealing ring 51 therefore lies against the pin sliding and sealing surface 43 in sealing manner and so as to slide.

The plunger 11 is also disposed within the flow channel 6 and mounted in the plug housing 5 so as to be displaceable back and forth in the axial direction. For this purpose, the first plunger sliding and sealing surface 59 of the plunger 11 lies against the two sealing rings 25 of the second plunger housing part 5b so as to slide in the axial direction. The two sealing rings 25 therefore lie against the first plunger sliding and sealing surface 59 in sealing manner and so as to slide. In a starting position (FIGS. 1, 5), the ring stop 60 furthermore lies against the inner wall surface 22b of the housing wall 22 of the second housing part 5b.

The plunger 11 furthermore lies in connection with the bearing bushing 8 so as to be displaceable back and forth in the axial direction. For this purpose, the second plunger sliding surface 62 of the plunger 11 lies against the plunger guide surface 47 of the bearing bushing 8 so as to slide in the axial direction. The plunger 11 can therefore be moved into and out of the bearing bushing 8 in telescope-like manner.

In order to hold the plunger 11 in its closed starting position, a plunger spring 68, particularly a helical spring, is furthermore present. The plunger spring 68 is disposed within the bushing recess in the region of the plunger guide surface 47 and within the plunger recess 63. It is supported on the second ring disk surface 48b at the one end and on the bottom recess surface 63b at the other end. In this connection, the plunger spring 68 is disposed around the plunger pin 11. The plunger spring 68 drives the plunger 11 in a valve closing direction 71 relative to the bearing bushing 8, which direction is opposite to the valve opening direction 70, and thereby toward the plug housing 5. As a result, the plunger 11 stands in connection with the plunger spring 68 so as to be driven in the valve closing direction 71, in other words into its starting position.

Furthermore, a pin spring 69, particularly a helical spring, is present, which drives the plunger pin 12 into its starting position, in which the closing valve 7 is closed. The spring pin 69 is disposed around the pin shaft 40 of the plunger pin 12 and is supported on the lower head side 39$b$ of the pin head 39 at one end and on the third ring disk surface 48$c$ at the other end. In this connection, the pin spring 69 is disposed within the plunger spring 68. The pin spring 69 drives the plunger pin 12 in the valve closing direction 71 relative to the bearing bushing 8, and thereby toward the plug housing 5. As a result, the plunger pin 12 stands in connection with the pin spring 69 so as to be drive in the valve closing direction 71, in other words into its starting position.

Because the closing valve 7 is connected with the plunger pin 12 so as to be non-displaceable in the axial direction, according to the invention, the closing valve 7 also stands in connection with the pin spring 69 so as to be driven in the valve closing direction 71, in other words into its closed starting position. As a result, the flow channel 6 is closed by the closing valve 7 in automatic or self-actuated manner in the uncoupled state of the coupling plug 2. In particular, the line-side flow space 6$b$ is hydraulically separated from the coupling-side flow space 6$a$.

As has already been explained above, it is furthermore frequently the case that a line-side or connection-side residual pressure $p_{residual}$ exists in the pressure medium system, particularly in the hydraulic system (FIGS. 1-5). This residual pressure $p_{residual}$ then exists in the line-side flow space 6$b$ in the closed valve position.

In the closed valve position, pressure forces that act directly on the outer bottom surface 28$a$ of the closing valve 7 and, by way of the plunger pin 12 and the nut 67, on the closing valve 7, result from the residual pressure $p_{residual}$ and drive the valve in the valve closing direction 71.

A force $F_{closing\ direction}$ therefore acts on the closing valve 7 in the valve closing direction 71. On the other hand, opposite pressure forces also act directly, particularly on the inner bottom surface 28 and the transition surface 33 of the closing valve 7, and, by way of the plunger pin 12 and the nut 67, on the closing valve 7, which forces drive the closing valve 7 in the valve opening direction 70.

In other words, a force $F_{opening\ direction}$ in the valve opening direction 72 acts on the closing valve 7 at the same time. A resulting force $F_{pressure,\ res,\ closed}$ results from these two opposite forces $F_{closing\ direction}$ and $F_{opening\ direction}$.

The resulting force $F_{pressure,\ res,\ closed}$ can be calculated from the two axial forces as follows:

$$F_{pressure,\ res,\ closed} = F_{closing\ direction} - F_{opening\ direction} = p_{residual} * (A_{closing\ direction,\ closed} - A_{opening\ direction,\ closed}),$$

where it holds true, in the present case:

$$A_{closing\ direction,\ closed} - A_{opening\ direction,\ closed} = A_{pressure,\ res,\ closed} = \pi/4 * (D_{LDR}^2 + D_{SDR}^2 - D_{VDR}^2)$$

In this connection, the surface area $A_{closing\ direction,\ closed}$ is the sum of all the attack surfaces of the closing valve 7, of the plunger pin 12, and of the nut 67, which are impacted by the residual pressure $p_{residual}$ in such a manner that the closing force $F_{closing\ direction}$ directed in the valve closing direction 71 acts on the closing valve 7 and on the plunger pin 12 that is firmly connected with it. Consequently, the surface area $A_{opening\ direction,\ closed}$ is the sum of all the attack surfaces of the closing valve 7, of the plunger pin 12, and of the nut 67, which are impacted by the residual pressure $p_{residual}$ in such a manner that the opening force $F_{opening\ direction}$ directed in the valve opening direction 70 acts on the closing valve 7 and on the plunger pin 12 that is firmly connected with it. The aforementioned attack surfaces $A_{closing\ direction,\ closing}$ and $A_{opening\ direction,\ closed}$ to which the residual pressure $p_{residual}$ is applied are the surfaces of the respective components disposed within the line-side flow space 6$b$. Of course, in this connection only the amount of the surface that is perpendicular to the respective force direction of the forces $F_{closing\ direction}$ and $F_{opening\ direction}$ is considered.

The diameter $D_{LDR}$ is furthermore the sealing diameter of the valve bearing sealing ring 20. This diameter consequently corresponds to the diameter of the valve sliding and sealing surface 35. This correspondence is because the valve bearing sealing ring 20 lies against the valve sliding and sealing surface 35, forming a seal. The diameter $D_{VDR}$ is the sealing diameter of the valve sealing ring 9, in other words the minimal diameter of the valve sealing ring 9, which occurs with the valve sealing ring 9 is maximally compressed. The diameter $D_{SDR}$ is the sealing diameter of the groove ring or plunger sealing ring 51. This diameter consequently corresponds to the diameter of the pin sliding and sealing surface 43. This correspondence is because the groove or plunger sealing ring 51 lies against the pin sliding and sealing surface 43, forming a seal.

According to a further independent aspect of the invention, the sealing diameters $D_{LDR}$ and $D_{VDR}$ (FIGS. 6, 8-10) of the valve bearing sealing ring 20 and of the valve sealing ring 9, as well as the diameter $D_{SDR}$ (FIGS. 8-10) are now selected in such a manner that in the closed valve position, the surface $A_{closing}$ direction, closed corresponds to the surface $A_{opening\ direction,\ closed}$. Therefore the force $F_{pressure,\ res,\ closed}$ that results from the residual pressure is =0. The closing valve 7 can easily be opened. Only the spring forces of the plunger spring 68 and of the pin spring 69 have to be overcome.

Using the sealing diameters $D_{LDR}$ and $D_{VDR}$ and $D_{SDR}$, the pressure force $F_{pressure,\ res}$ that results from the residual pressure $p_{residual}$ can consequently be set in targeted manner. According to the invention, this force can be set as a function of whether a screw coupling or a plug-in coupling is involved. In the case of plug-in couplings, a force of 200 to 300 N can generally be overcome, for example; in the case of screw couplings, a force of approximately 6000 to 7500 N can be overcome. It is practical to use those couplings that can at least be coupled at a remaining residual pressure $p_{residual}$ of 25 MPa. Accordingly, the surface $A_{pressure,\ res,\ closed}$ lies at 0 to 300 mm², preferably at 0 to 240 mm² in the case of a screw coupling, and at 0 to 12 mm², preferably 0 to 8 mm², in the case of a plug-in coupling.

As soon as the closing valve 7 has been opened, the pressure is furthermore also balanced out, according to the invention, because the same pressure p prevails in the two flow spaces 6$a$; b, in other words the entire flow channel 6, and the attack surfaces $A_{closing\ direction,\ open}$ and $A_{opening\ direction,\ open}$ are the same. This balance occurs because now pressure is applied to the entire valve sealing surface 31. It is also applied, however, to the conical valve contact surface 37 and to the coupling-side plunger end 12$b$ at the plunger pin 12. In this way, the closing valve 7 is prevented from suddenly opening completely after it has opened.

As a result, in the open valve position, it holds true for the sum $A_{closing\ direction,\ open}$ of all the attack surfaces to which a pressure p that can occur in the flow channel 6 is applied, in such a manner that a closing force $F_{closing\ direction}$ that is directed in the valve closing direction 71 acts on the closing valve 7, and for the sum $A_{opening\ direction,\ open}$ of all the attack surfaces to which a pressure p that can occur in the flow channel 6 is applied, in such a manner that a force $F_{opening\ direction}$ that is directed in the valve opening direction 70 acts on the closing valve 7, that:

$$A_{pressure,\ res,\ open} = A_{closing\ direction,\ open} - A_{opening\ direction,\ open} = 0.$$

Before the coupling process is now described in greater detail, the coupling cuff 3 will briefly be explained in greater detail (FIGS. 1-4):

The coupling cuff 3 has a cuff housing 72, which consists, for example, of three cuff housing parts 72a; 72b; 72c that are firmly but releasably connected with one another. The cuff housing 72 also delimits a flow channel 73 and has an axially displaceable valve sleeve 74 that closes off the flow channel 73 in the uncoupled state. Furthermore, the coupling cuff 3 has a locally fixed plunger pin 75. The plunger pin 75 has a valve sealing ring 76 at its pin head, against which ring the valve sleeve 74 lies, driven by a valve spring 77, forming a seal. Furthermore, the coupling cuff 3 has a spring-loaded push sleeve 78 and an outer locking sleeve 79 having an inside thread, which sleeve is displaceable on the cuff housing 72.

Figure 3:
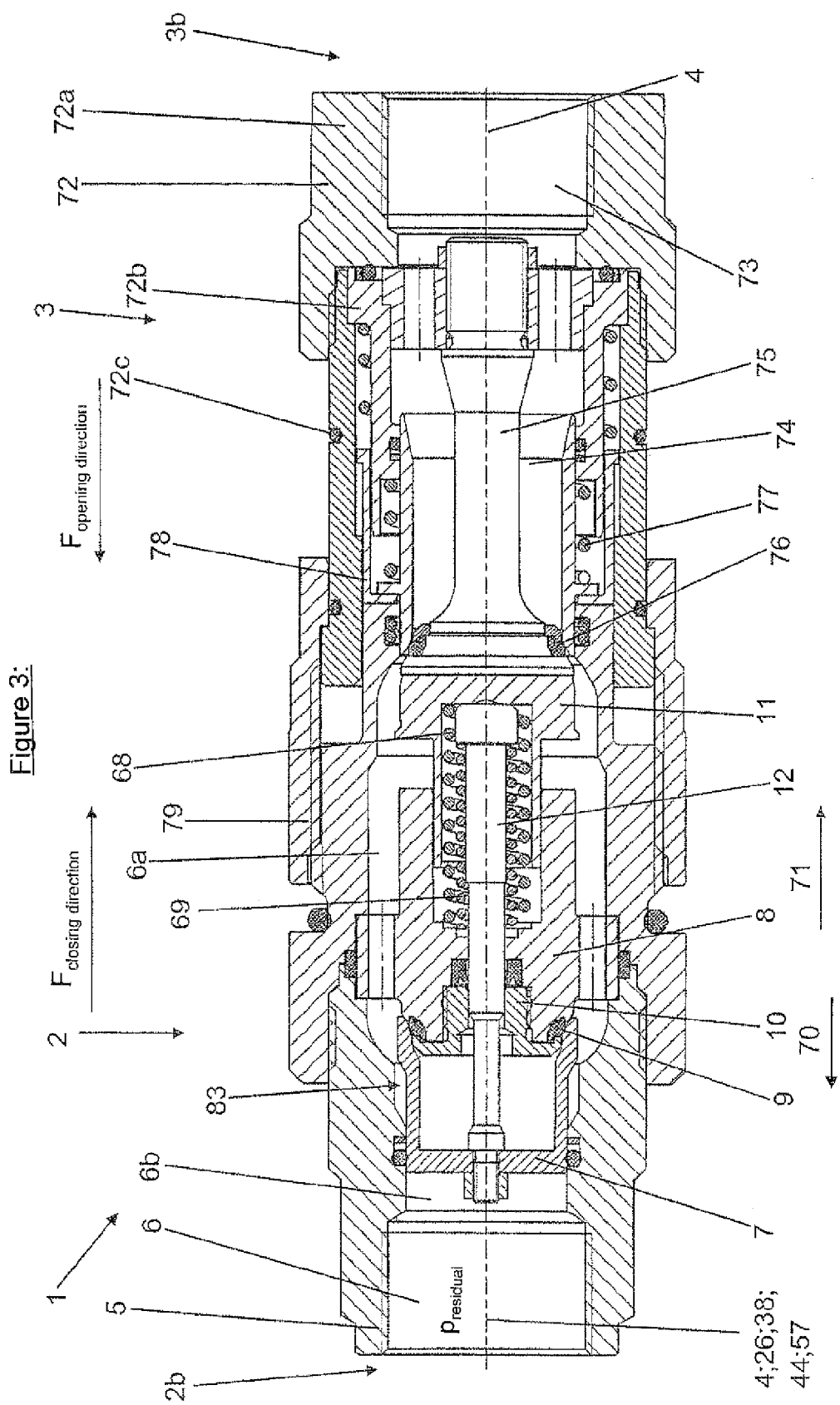
FIG. 3 shows a longitudinal section of the coupling according to the invention, during the further progression of the plug-in process.
Figure 4:
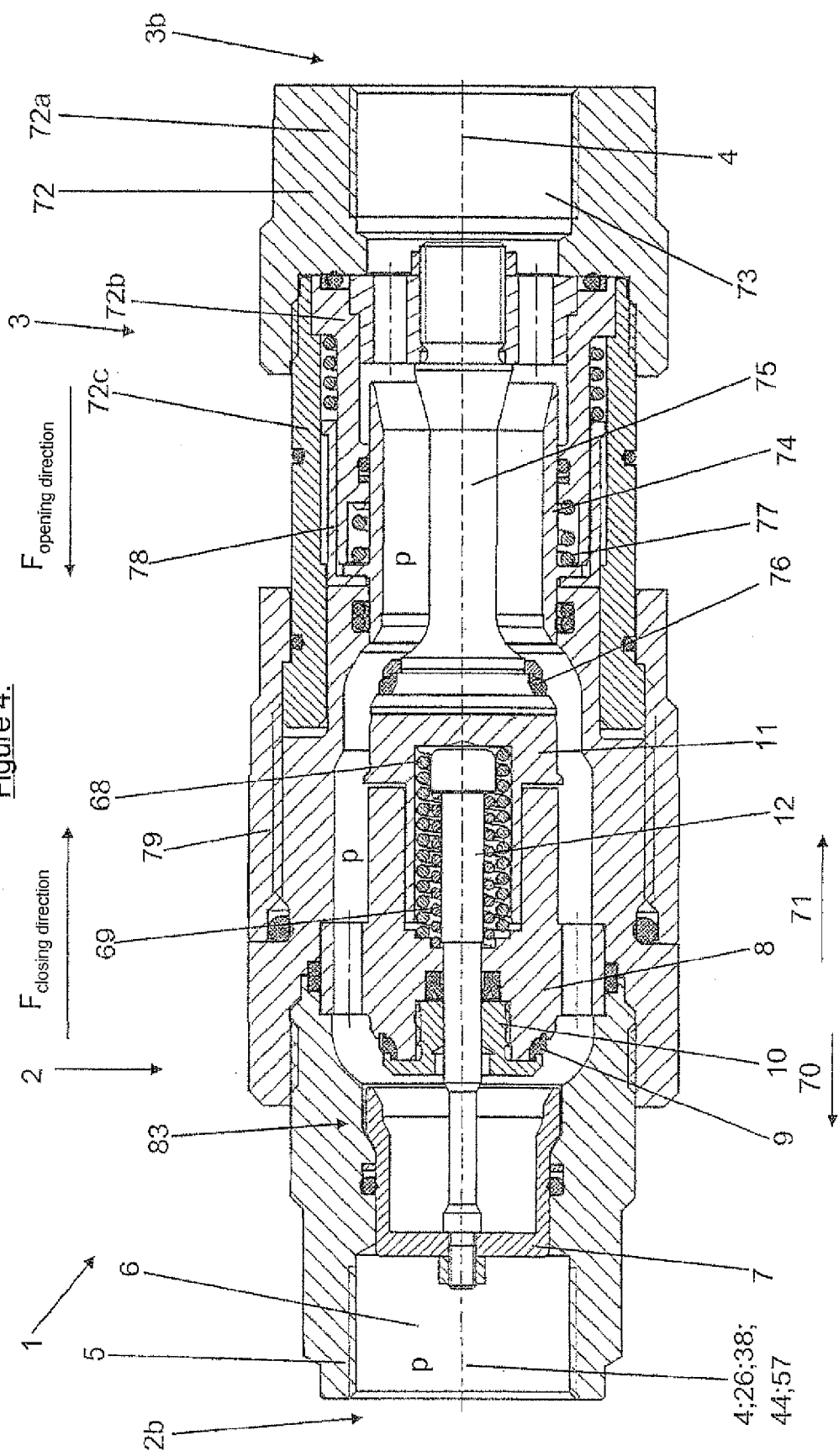
FIG. 4 shows a longitudinal section of the coupling according to the invention, in the completely plugged-in or coupled state.

When the two coupling parts 2; 3 are brought together, particularly plugged into one another or screwed into one another, parallel to the coupling axis 4, the plunger pin 75 of the coupling cuff 3 presses on the upper head side 58a of the plunger head 58 of the plunger 11 and drives the plunger 11 in the valve opening direction 70, relative to the plug housing 5, the bearing bushing 8 and the plunger pin 12 and the closing valve 7. In this connection, the plunger 11 moves into the bushing recess 45 with the plunger shaft 61, in telescope-like manner, until the bottom recess surface 63b of the plunger recess 63 comes up against the upper head side 39a of the pin head 39 (FIG. 3). Starting from this point in time, the plunger pin 12 and the closing valve 7 firmly connected with it are entrained or driven by the plunger 11 and moved in the valve opening direction 70 together with it. In this connection, the closing valve 7 lifts off from the valve sealing ring 9 and the valve seat surface 56, so that the flow channel 6 is opened. As a result, the two flow spaces 6a; 6b are connected with one another in terms of flow technology, particularly hydraulically. Fluid can now flow through the flow passages 30, through the closing valve 7, and past the bearing sleeve 8 on the outside, and through the flow passages 54. In the open position, the closing valve 7 therefore does not close off the flow channel 6.

The closing valve 7 is therefore driven in the valve opening direction 70, from its closed position into its open position by the plunger 11 during the coupling process.

In the same manner, the flow channel 73 of the coupling cuff 3 is automatically opened. The valve sleeve 74, driven by the plug housing 5, lifts off from the valve sealing ring 76 and the plunger pin 75, and releases the flow channel 73.

When the parts are screwed together (the two coupling parts 2; 3 are pushed together by way of the thread), the locking sleeve 79 is screwed onto an outside thread of the outer wall surface 22a of the second plug housing part 5b, and the two coupling parts 2; 3 are locked into one another in this way.

When the two coupling parts 2; 3 are unscrewed from one another again, all the parts automatically move back into their starting position in the reverse direction, in other words in the case of the coupling plug 2, in the valve closing direction 71. The drive is provided by the springs 68; 69; 77. In this connection, the closing valve 7, the plunger pin 12 and the plunger 11 move together until the closing valve 7 lies against the valve sealing ring 9 and the valve seat surface 56. Subsequently, the plunger 11, driven by the plunger pin 68, moves further in the valve closing direction 71, relative to the closing valve 7 and the plunger pin 12, back into its starting position.

It is the advantage of the invention, for one thing, that the pressure force that results from the residual pressure $p_{residual}$, which acts on the plunger pin 12 by way of the diameter $D_{SDR}$, must first be overcome when the closing valve 7 is opened. As a result, the plunger 11 can be opened first, with clearly reduced expenditure of force. Furthermore, after the closing valve 7 has been opened, the pressure p that then occurs in the entire coupling plug 1 acts on all the surfaces of the unit composed of closing valve 7, plunger pin 12, and nut 67. As a result, this module is free of resulting pressure forces, thereby preventing the closing valve 7 from suddenly moving to its completely open position after it has been opened.

Furthermore, the coupling plug 1 according to the invention has a very simple structure, in this connection.

Furthermore, the construction length can be clearly reduced by means of the nested arrangement of the two springs 68, 69. In order to prevent jamming of the springs 68; 69 relative to one another, the two springs 68; 69 should be wound in opposite directions. This arrangement furthermore has the advantage that the coupling plug can be structured more advantageously in terms of flow technology.

The coupling part according to the invention can furthermore, of course, also be a coupling cuff.

In place of the locking sleeve, a different locking device for releasable locking of the two coupling parts can furthermore also be present, for example a retaining ball locking mechanism. The coupling according to the invention can thereby, of course, also be configured as a plug-in coupling.

It furthermore also lies within the scope of the invention that the valve bearing sealing ring 20 is disposed in a circumferential groove of the closing valve 7 and/or that the valve sealing ring 9 is firmly connected with the closing valve 7.

Furthermore, the plunger pin 12 can also be firmly connected with the closing valve 7 in a different way. For example, the plunger pin can be screwed into the closing valve 7 or attached to the latter with a circlip.

Furthermore, it lies within the scope of the invention that the valve seal 83 is configured in a different way from conically forming an inside seal, for example as a flat seal or forming a flat seal (FIG. 10) or cylindrically forming an outside seal (FIG. 9). Of course, it would also be possible to structure the valve seal 83 to cylindrically form an inside seal or to conically form an outside seal (not shown).

In the case of the valve seal 83 that cylindrically forms an outside seal (FIG. 9), the cylindrical surface 36 of the closing valve 7 serves as the valve sealing surface 31a. The valve sealing ring 9a and preferably a support ring 80 lie against this surface. The two rings 9a; 80 are disposed in a circumferential ring groove 81 of the bearing sleeve 8. The closing valve 7 preferably furthermore has a ring-shaped sleeve face surface 82 in place of the conical valve sealing surface 31. The planar sleeve face surface 82 is perpendicular to the longitudinal valve axis 26. The closing valve 7 lies against the bearing bushing 8 with the sleeve face surface 82 in its closed position. The sealing diameter $D_{VDR}$ of the valve sealing ring 9a corresponds to the diameter of the valve sealing surface 31a in this case.

In the case of the valve seal 83 that forms a flat seal (FIG. 10), the sleeve face surface 82 of the closing valve 7 serves as the valve sealing surface 31b. The valve sealing ring 9b lies against this surface.

In this case, the sealing diameter $D_{VDR}$ of the valve sealing ring 9b corresponds to the minimal or inside diameter of the ring groove 81. If the ring groove 81 were to project radially beyond the sleeve face surface 82 that serves as the valve sealing surface 31b, toward the inside, the sealing diameter $D_{VDR}$ would be the minimal or inside diameter of the sleeve face surface 82. The sealing diameter is always the smallest diameter that forms a seal.

Although only a few embodiments of the present invention have been shown and described, it is to be understood that many changes and modifications may be made thereunto without departing from the spirit and scope of the invention.

What is claimed is:

1. A coupling part for coupling with a corresponding coupling part of a coupling for a pressure medium line comprising
   (a) a housing having a flow channel and a coupling axis;
   (b) a sleeve-shaped closing valve displaceable back and forth in the axial direction within the flow channel for closing off the flow channel in an uncoupled state of the coupling part, wherein the closing valve has a closed valve position closing off the flow channel and an open valve position not closing off the flow channel;
   (c) a plunger displaceable back and forth in the axial direction within the flow channel to drive the closing valve in a valve opening direction during a coupling process; and
   (d) a plunger pin disposed between the plunger and the closing valve within the flow channel for transferring movement of the plunger in the valve opening direction to the closing valve;
   wherein the plunger pin is connected with the closing valve so as to be non-displaceable in the axial direction.

2. The coupling part according to claim 1, wherein the coupling part is a coupling plug, the corresponding coupling part is a coupling cuff, and the pressure medium line is a hydraulic line.

3. The coupling part according to claim 1, wherein the plunger pin is at a distance from the plunger in the axial direction in the closed position of the closing valve.

4. The coupling part according to claim 1, wherein the plunger pin is disposed so that the movement of the plunger in the valve opening direction is transferred to the closing valve after a delay.

5. The coupling part according to claim 1, wherein the plunger pin is connected with the closing valve at a first end and is brought into connection with the plunger at a second end.

6. The coupling part according to claim 1, wherein the coupling part has a bearing bushing disposed within the flow channel and connected with the housing so as to be non-displaceable in the axial direction, wherein the plunger pin is mounted in a bushing recess of the bearing bushing so as to slide and to be axially displaceable.

7. The coupling part according to claim 1, wherein the plunger is configured in beaker shape and has a plunger recess shaped as a dead-end bore, wherein the plunger recess extends into the plunger in the axial direction, is open toward the closing valve, and has a bottom recess surface.

8. The coupling part according to claim 7, wherein the plunger pin is connected with the closing valve at a first end and is disposed within the plunger recess at a second end, and wherein the plunger pin is at a distance from the bottom recess surface in a starting position of the plunger pin.

9. The coupling part according to claim 6, wherein the coupling part has a plunger spring standing in connection with the plunger so as to drive the plunger in a valve closing direction opposite to the valve opening direction, and wherein the plunger spring is supported on the plunger at a first end and on the bearing bushing at a second end.

10. The coupling part according to claim 6, wherein the coupling part has a pin spring standing in connection with the plunger pin and the closing valve so as to drive the plunger pin and the closing valve in the valve closing direction opposite to the valve opening direction, wherein the pin spring is supported on the plunger pin at a first end and on the bearing bushing at a second end.

11. The coupling part according to claim 10, wherein the pin spring is disposed around a pin shaft of the plunger pin and a plunger spring is disposed around the pin spring.

12. The coupling part according to claim 11, wherein the pin spring and the plunger spring are wound in opposite directions.

13. A coupling for a pressure medium line comprising a first coupling part and a second coupling part releasably lockable into one another;
   wherein the first and second coupling parts comprise first and second coupling housings, respectively, having first and second flow channels and first and second closing valves, respectively, disposed within the first and second flow channels, respectively, to close off the respective flow channels in an uncoupled state of the coupling;
   wherein the first and second closing valves are automatically opened when the first and second coupling parts are coupled; and
   wherein the first coupling part comprises:
   (a) the first coupling housing having the first flow channel and a coupling axis;
   (b) the first closing valve, wherein the first closing valve is sleeve-shaped and displaceable back and forth in the axial direction within the first flow channel for closing off the first flow channel in the uncoupled state of the first coupling part, wherein the first closing valve has a closed valve position closing off the first flow channel and an open valve position not closing off the first flow channel;
   (c) a plunger displaceable back and forth in the axial direction within the first flow channel to drive the first closing valve in a valve opening direction during a coupling process; and
   (d) a plunger pin disposed between the plunger and the first closing valve within the first flow channel for transferring movement of the plunger in the valve opening direction to the first closing valve;
   wherein the plunger pin is connected with the first closing valve so as to be non-displaceable in the axial direction.

14. The coupling according to claim 13, wherein the Pressure medium line is a hydraulic line, the first coupling part is a coupling cuff, and the second coupling part is a coupling plug.

* * * * *